United States Patent [19]

Forbes et al.

[11] Patent Number: 5,011,170
[45] Date of Patent: Apr. 30, 1991

[54] PEDAL CYCLE AND MOTORCYCLE TRAILER

[76] Inventors: Alexander D. Forbes; Sheena C. Forbes, both of 11 Millburn Park, Baltasound, Shetland, Scotland, ZE29EB

[21] Appl. No.: 500,528

[22] Filed: Mar. 26, 1990

[51] Int. Cl.⁵ .................... B62K 27/00; B62J 7/04
[52] U.S. Cl. ...................... 280/204; 280/292; 280/494; 280/512
[58] Field of Search ............ 280/204, 292, 492, 494, 280/512, 511, 504, 400; 403/57, 58, 142, 159

[56] References Cited

U.S. PATENT DOCUMENTS

| | | | |
|---|---|---|---|
| 660,598 | 10/1900 | Stonebridge | 280/204 |
| 3,843,164 | 10/1974 | Flegel | 280/204 X |
| 3,877,723 | 4/1975 | Fahey et al. | 280/204 |
| 4,325,564 | 4/1982 | Phipps | 280/492 X |
| 4,342,467 | 8/1982 | Kester | 280/204 |
| 4,413,835 | 11/1983 | Hazelett | 280/204 |
| 4,756,541 | 7/1988 | Albitre | 280/204 |
| 4,799,706 | 1/1989 | Myers et al. | 280/504 |

FOREIGN PATENT DOCUMENTS

| | | | |
|---|---|---|---|
| 863910 | 12/1952 | Fed. Rep. of Germany | 280/204 |
| 794900 | 2/1936 | France | 280/204 |
| 8200468 | 9/1983 | Netherlands | 280/204 |
| 2161119 | 1/1986 | United Kingdom | 280/204 |

Primary Examiner—Richard A. Bertsch
Assistant Examiner—Kevin Hurley
Attorney, Agent, or Firm—Leon Gilden

[57] ABSTRACT

This invention relates to trailers and in particular to trailers for use with bicycles and motorcycles. This trailer will secure belongings inside, protecting them from the elements. The trailer is easily hooked and unhooked in a matter of seconds and is unmatched in its handling ability as it travels behind the cycle or motorcycle. The trailer may be removed 90 degrees relative to the bike when moving or parked. Locking it in such a position while parked prevents it from being wheeled away. The cyclist is a much more visible object on the road due to the added width the trailer provides and the trailer should contain reflectors or lights for added visibility. A pivot assembly allows up and down motion which will enable the trailer to follow undulations in the road or terrain; allows horizontal or sideways motion to enable the trailer to follow left or right turns by the cyclist and prevents rotation in the horizontal axis to enable the trailer to follow the cyclist's lean on corners. The inside of the trailer contains removable compartments and the top opens up to 180 degrees to form a table suitable for eating, writing, reading maps, etc.

5 Claims, 4 Drawing Sheets

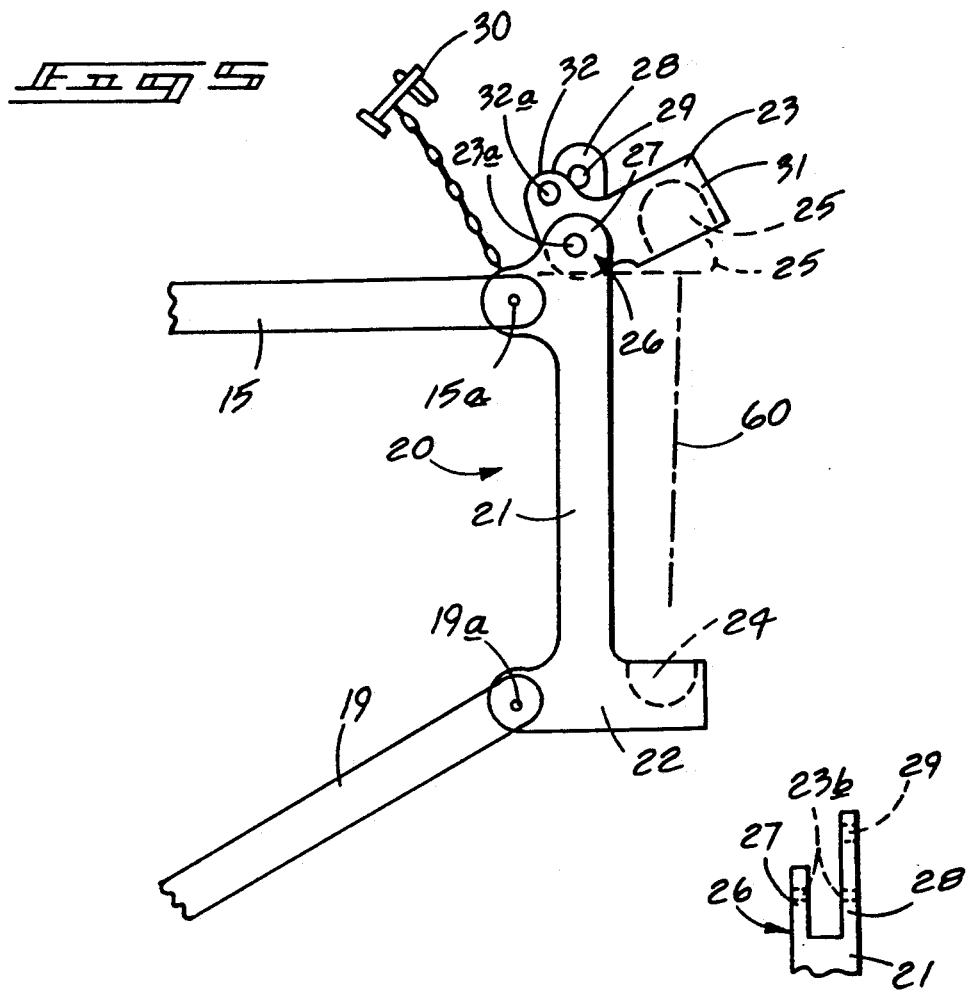
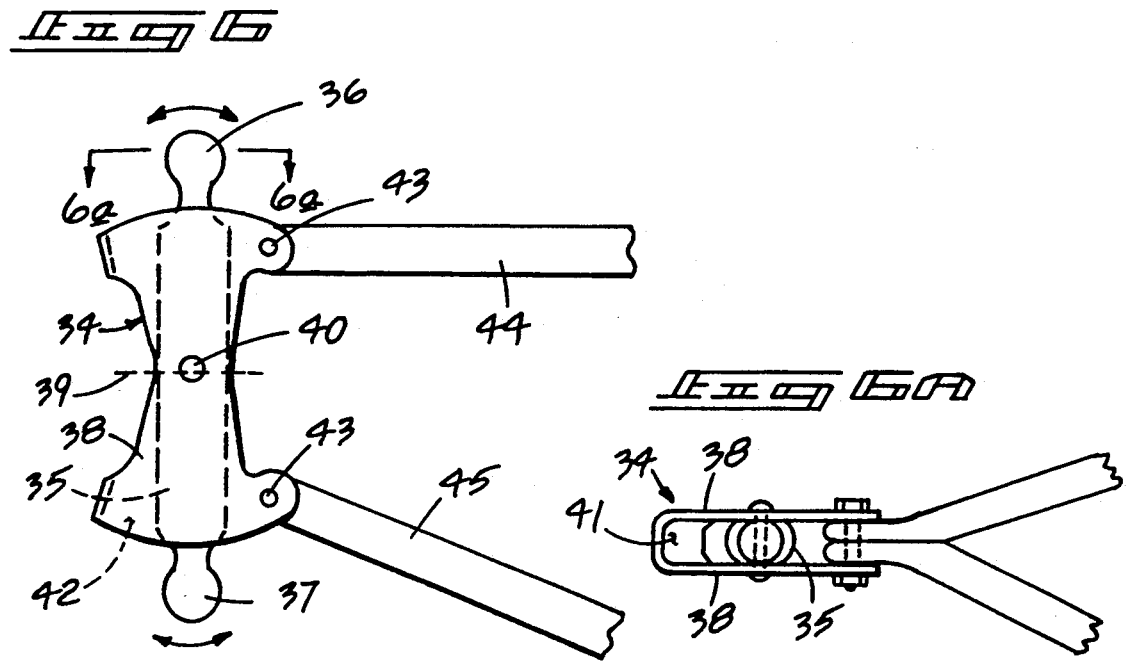

PEDAL CYCLE AND MOTORCYCLE TRAILER

BACKGROUND OF THE INVENTION

1. Field of the Invention

The field of invention relates to bicycle trailers, and more particularly pertains to a new and improved bicycle trailer coupling apparatus wherein the same includes an improved linking arrangement between the bicycle and the trailer, as well as an improved support stand for the trailer during periods of non-use.

The trailer is fixed to the cycle by four steel tubes extending forward from the trailer and these tubes lend into a pivoting assembly to allow movement in two directions and prevents motion in a third direction. From the pivot assembly three arms extend forward to connect to the cycle. The trailer back and sides are in a "U" shape, the front comes to a point with a "V" shape. The single wheel is located inside the trailer in the center, a slot in the trailer sections off the left and right side with the wheel in the middle. The wheel may be either spoked or made of solid press metal or plastic. The pivot assembly includes an upper and lower ball joint, the lower fitting into a receptacle, while the upper is enclosed by a locking hinge receptacle. The top ball cup or receptacle is pivoted to rotate in the vertical plane. The trailer may additionally be fitted with two or more retractable legs, either incorporated in the towbar frame or fixed to either or both sides of the trailer body, such that when the legs are lowered, the trailer self-supports in an upright and horizontal position as when attached to the cycle. This facilitates hitching and unhitching from the cycle or the trailer's use as a table. Alternatively, a stand may be provided, of hollow molded metal, plastic or other material, such that it lies substantially flat on the ground and provides a central channel which can accommodate the single wheel, with side supports for the trailer body.

2. Description of the Prior Art

The prior art has utilized trailer organizations in accommodation with bicycles to enable transport of various cargo items relative to the bicycle. The disadvantage of the prior art has typically been the provision of two-wheeled trailers with lateral wheel placement which adversely effects the handling properties and stability of the two-wheeled towing vehicle when operated by an individual utilizing the bicycle and trailer. Since bicycles have fore and aft in-line wheel placement, the rider must "lean into" corners or turns in the road to counteract angular momentum forces tending to oppose the turn.

Two-wheeled trailers with lateral wheel placement, on the other hand, having built-in stability because of weight distribution, remain upright on corners but tend to "run on", necessitating continual correction in tracking. Furthermore, retardation of either wheel by obstructions or bumps on the road surface tends to cause lateral oscillation of the trailer, this oscillation then being transmitted through the coupling apparatus to the bicycle.

As the use of trailers has increased substantially due to the increased utility and capacity of trailers and bicyclists employing such capacity to an advantage in transport of various articles therewithin, a need exists for a new and improved single-wheeled trailer, pivotal arrangement and coupling between the bicycle and trailer. Examples of the prior art include U.S. Pat. No. 4,721,320 to Craps, et al., illustrating a typical trailer to a forwardly oriented bicycle with a generally spring-biased mounting therebetween to absorb shock and vibration therebetween.

U.S. Pat. No. 4,685,691 to Tremblay includes a "U" shaped tandem trailer for encompassing a bicycle, wherein the trailer is mounted forwardly of the bicycle or self-propelled motorcycle for transport of the trailer therewith.

U.S. Pat. No. 3,747,955 to MacAlpine sets forth a tandem trailer aligned with a bicycle enabling horizontal rotation relative to a central vertical frame of the bicycle.

U.S. Pat. No. 4,274,649 to Vanderhorst similarly enables horizontal rotation of the trailer to an associated bicycle wherein consistent with the prior art, the trailer has limited ability to follow the bicycle in an undulating manner relative to the road.

U.S. Pat. No. 4,342,467 to Kester sets forth a trailer secured to the bicycle utilizing a vertical axis connection to associate the trailer to the bicycle, as is typical of the prior art.

As such, it may be appreciated that there is a continuing need for a new and improved bicycle trailer and coupling apparatus wherein the same addresses the problem of enabling the trailer to accommodate varying roadway conditions during the course of the trailer associated with the bicycle in roadway use.

SUMMARY OF THE INVENTION

In view of the foregoing disadvantages inherent in the known types of bicycle trailer apparatus now present in the prior art, the present invention provides a bicycle trailer and coupling apparatus wherein the same enables horizontal and vertical displacement of the trailer relative to the bicycle during use. As such, the general purpose of the present invention, which will be described subsequently in greater detail, is to provide a new and improved bicycle trailer and coupling apparatus which has all the advantages of the prior art bicycle trailer and coupling apparatus and none of the disadvantages.

To attain this, the present invention utilizes a conventional bicycle including a rearwardly horizontally directed bicycle frame integrally mounted to the main frame of the bicycle with an angular frame directed rearwardly of the bicycle secured to an axle of the bicycle, wherein the frame portions as above noted are secured to an "L" shaped mounting yoke, wherein the mounting yoke includes a lower hemispherical cup aligned with an upper hemispherical cup mounted to a pivoted arm, wherein the upper and lower cups are aligned when the upper cup is in a lowered position. The cups retain a hitch pin therebetween, and the hitch pin is mounted within a pair of parallel plates provided with upper and lower "V" shaped segments to enable rotation of the yoke relative to a horizontal pin axis directed orthogonally through the plates, as well as enabling horizontal rotation of the pin within the hemispherical cups while preventing longitudinal twist of one part of the coupling frame relative to the other across the coupling enabling two-dimensional accommodation of the trailer relative to the bicycle during use. Furthermore, a support stand for the trailer is provided formed with upper surfaces accommodating in a complementary manner the lower surfaces of the trailer and provided with a central "U" shaped channel to receive the bicycle wheel therewithin.

The invention resides not in any one of these features per se, but rather in the particular combination of trailer, coupling apparatus and stand herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constuctions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle trailer and coupling apparatus which has all the advantages of the prior art bicycle trailer and coupling apparatus and none of the disadvantages.

It is another object of the present invention to provide a new and improved bicycle trailer and coupling apparatus which may be easily and efficiently manufactured and marketed.

It is a further object of the present invention to provide a new and improved bicycle trailer and coupling apparatus which is of a durable and reliable construction.

An even further object of the present invention is to provide a new and improved bicycle trailer and coupling apparatus which is susceptible of a low cost of manufacture with regard to both materials and labor, and which accordingly is then susceptible of low prices of sale to the consuming public, thereby making such bicycle trailer and coupling apparatus economically available to the buying public.

Still yet another object of the present invention is to provide a new and improved bicycle trailer and coupling apparatus which provides in the apparatuses and methods of the prior art some of the advantages thereof, while simultaneously overcoming most of the disadvantages normally associated therewith.

Still another object of the present invention is to provide a new and improved bicycle trailer and coupling apparatus wherein the coupling apparatus accommodates vertical and horizontal pivotment of the trailer relative to the bicycle, while preventing horizontal rotation of the trailer to the bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic cross-sectional view taken in elevation of the securement yoke of the instant invention.

FIG. 5a is an orthographic forward view of the securement yoke of the instant invention illustrating the bifurcated upper end thereof.

FIG. 6 is an orthographic view taken in elevation of the hitch pin and its associated housing of the instant invention.

FIG. 6a is an orthographic view taken along the lines 6a—6a of FIG. 6 in the direction indicated by the arrows.

DESCRIPTION OF THE PREFERRED EMBODIMENT

Figure 1:
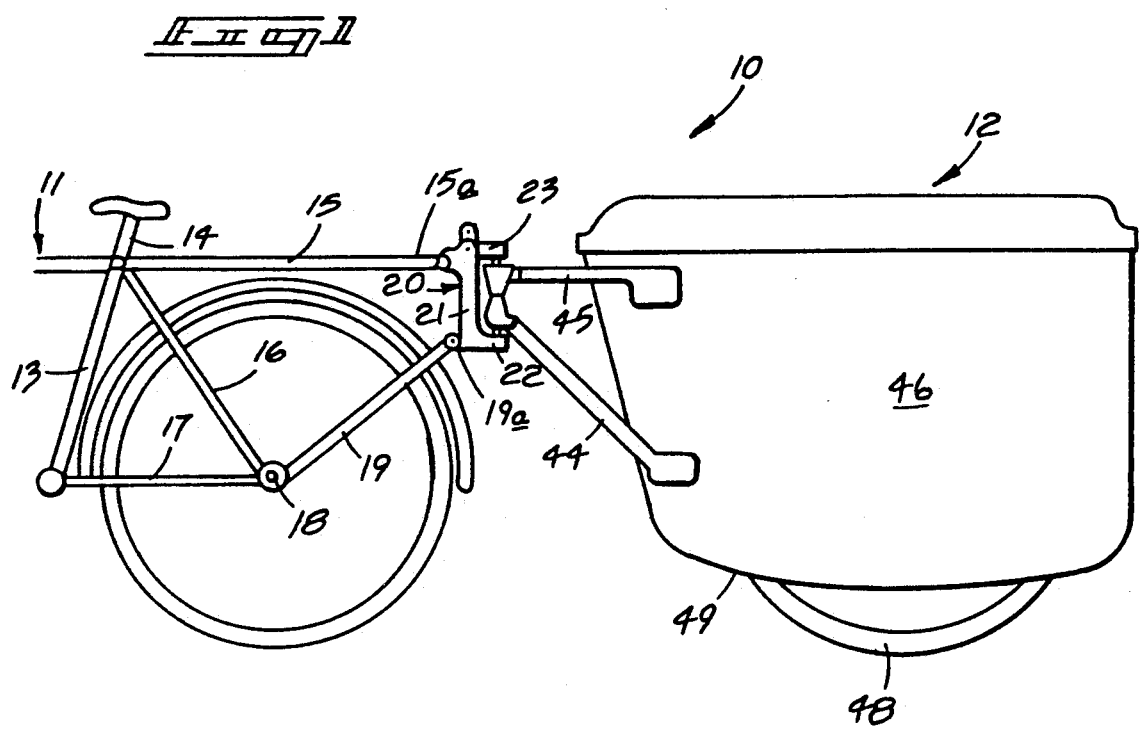
FIG. 1 is an orthographic view taken in elevation of the bicycle and trailer arrangement of the instant invention.

With reference now to the drawings, and in particular to FIGS. 1 to 8 thereof, a new and improved bicycle trailer and coupling apparatus embodying the principles and concepts of the present invention and generally designated by the reference numeral 10 will be described.

More specifically, the bicycle trailer and coupling apparatus 10 essentially comprises a bicycle assembly 11 associated with a trailer organization 12. The bicycle assembly 11 includes a generally vertically oriented main support tube 13 reciprocatably receiving a seat support tube 14 and an associated seat therewithin from an upper terminal end thereof. A rearwardly extending horizontal first link 15 extends rearwardly overlying a rear wheel of the bicycle assembly with a second link 16 and a third link 17 secured to upper and lower terminal ends respectively of the main support tube 13 and secured at outer ends to a rear wheel axle 18 horizontally disposed. A fourth link 19 is directed upwardly and rearwardly of the rearward axle 18 and is secured to a lower terminal end of an "L" shaped mounting yoke 20 with an upper terminal end of the fourth link 19. The rear terminal end of the first link is secured to an upper terminal end of the "L" shaped mounting yoke 20, as illustrated in FIG. 1 for example.

Figure 3:
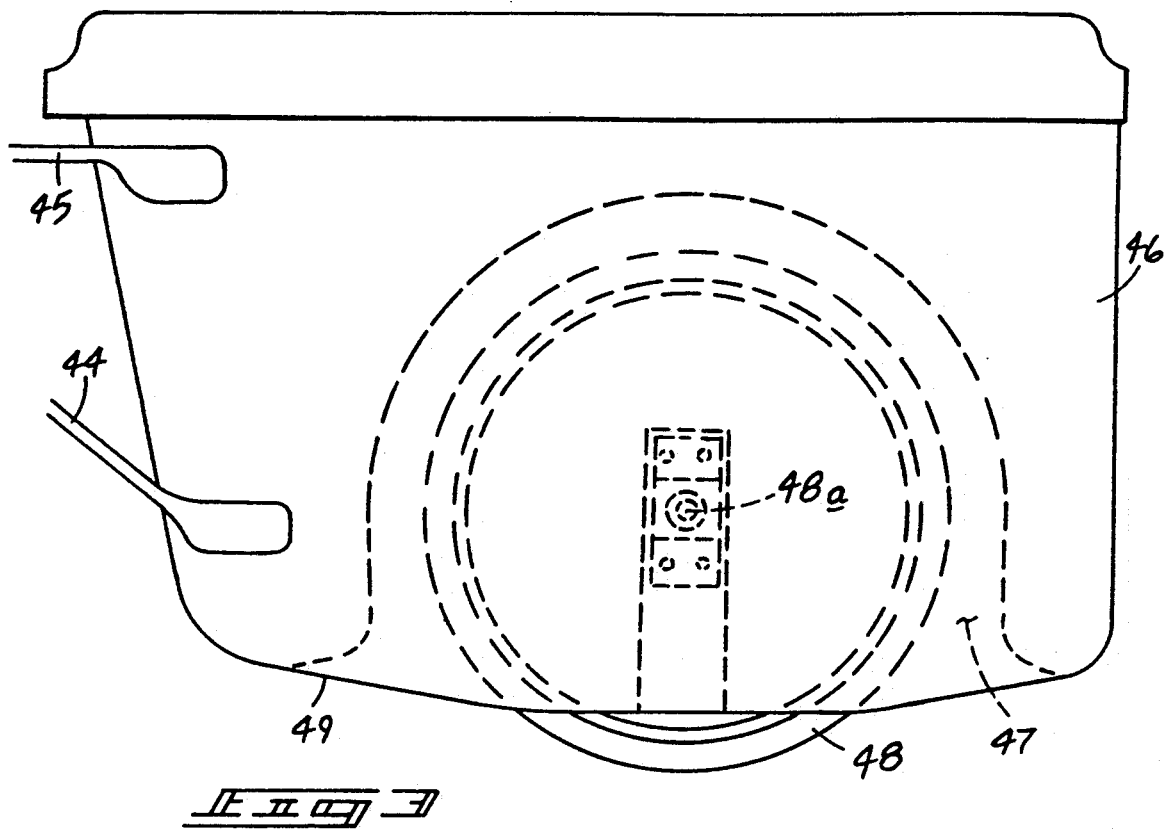
FIG. 3 is an orthographic view taken in elevation of the trailer arrangement of the instant invention.

Reference to FIG. 5 illustrates an enlarged "L" shaped mounting yoke 20 formed with a horizontal leg 22 orthogonally and integrally mounted to a vertical leg 21 extending upwardly from the horizontal leg to define the "L" shaped mounting yoke. The "L" shaped mounting yoke includes an "L" shaped pivoting cup member 23 pivotally mounted to an upper end of the vertical leg 21 which is bifurcated, as illustrated in FIG. 5a. An upper interior surface of the horizontal leg 22 includes an interiorly directed first hemispherical recess 24 with a vertically aligned axis aligned with a second hemispherical recess 25 formed within the cup members first leg 31, wherein the first and second hemispherical recesses 24 and 25 are coaxially aligned and in confronting relationship relative to one another when the pivoting cup member 23 is in a lowered position, as illustrated in FIG. 5 in phantom. The "U" shaped bifurcated upper terminal end 26 of the vertical leg 21 includes a first yoke leg 27 parallel to and spaced from a second yoke leg 28, wherein the second yoke leg extends beyond and upwardly of the first yoke leg, wherein the first and second yoke legs each include aligned apertures 23b for receiving a pivot cup axle 23a that is directed adjacent an apex of the pivot cup first leg 31 and the pivot cup second leg 32 that are mutually orthogonally mounted relative to one another. The pivot cup vertical second leg 32 includes an aperture 32a that is alignable with a lock aperture 29 spaced above and aligned with the aperture 23 within the second yoke leg 28, whereupon rotation of the pivot cup member 23 into a lowered position, as illustrated in phantom in FIG. 5, the second leg aperture 32a is aligned with the second yoke leg lock aperture 29 to receive a lock pin 30 therethrough to secure the pivot cup members downward orientation in the lowered position, as illustrated in phantom in FIG. 5. The first and second hemispherical recesses of the vertical leg 21 and the pivot cup first leg 31 are spaced a distance to receive the upper and lower respective spherical ends 36 and 37 of a substantially cylindrical hitch pin 35 having two flattened opposite parallel sides. The hitch pin 35 is pivotally mounted about its medial center within a hitch pin housing 34, wherein a horizontal hitch pin axle 40 is directed orthogonally through the hitch pin relative to its longitudinal axis to enable the hitch pin to pivot between the side plates 38 of the hitch pin housing 34. The side plates 38 are defined by coaxially aligned mirror image truncated triangular segments joined together at their forward ends, wherein the side plates 38 are spaced a distance equal to the lesser thickness of the flat-sided hitch pin 35, wherein an upper "V" shaped chamber 41 and a lower "V" shaped chamber 42 are formed between the side plates 33 within the hitch pin housing 34 to enable limited rotational pivotment of the hitch pin 36 about its axle 40 and as illustrated, the securement of the upper and lower spherical ends 36 and 37 within the respective hemispherical cups 24 and 25 enables rotational motion of the hitch pin 35 relative to the "L" shaped mounting yoke 20 in a horizontal plane parallel to the hitch pin axle 40. The upper and lower peripheries of the side plates 38 are arcuate, as illustrated in FIG. 6, to provide clearance for the rotation of the hitch pin 36 during its rotation within the housing 34. The upper rear and lower terminal ends of the housing 34 includes upper and lower ears 43 to integrally receive upper and lower respective trailer links 44 and 45 directed rearwardly and secured to the trailer housing 46. The trailer housing 46 includes a "U" shaped wheel chamber 47 directed from a bottom surface upwardly thereof, and wherein the wheel chamber 47 is aligned parallel to the sides of the trailer housing 46 to receive a trailer tire 48 rotatably therewithin mounted upon a trailer tire axle 48a secured to mounting plates integrally mounted within opposed and confronting surfaces of the chamber 47, as illustrated in FIGS. 3 and 4 for example.

Figure 2:
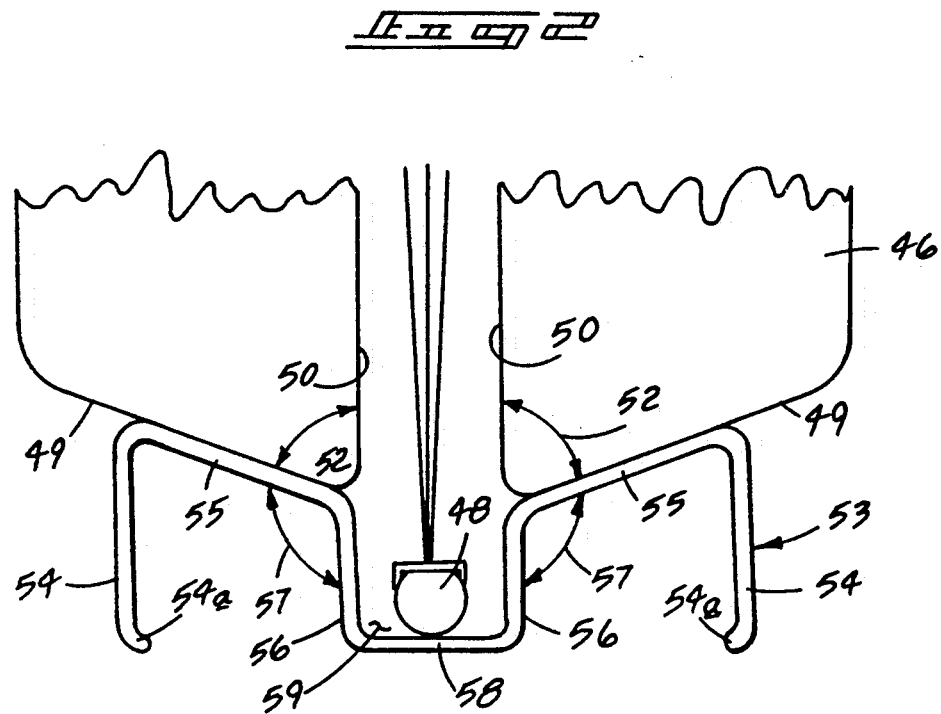
FIG. 2 is an orthographic cross-sectional view illustrating the trailer and support stand of the instant invention.
Figure 4:
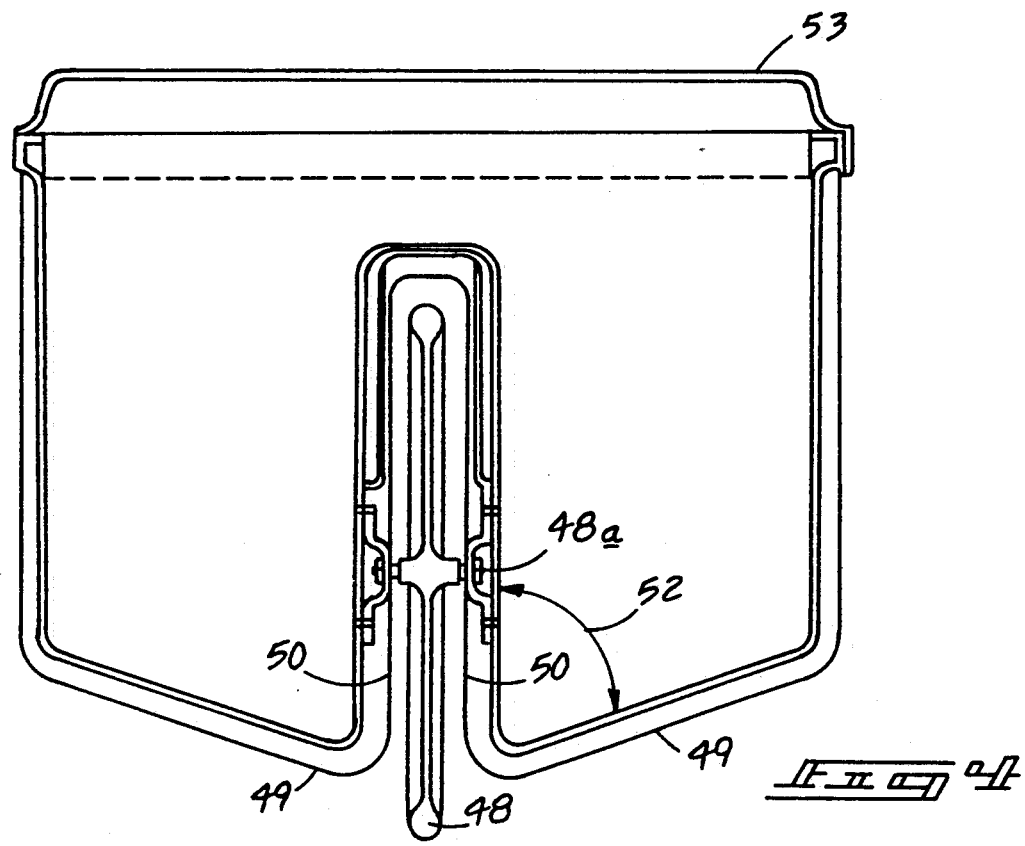
FIG. 4 is an orthographic cross-sectional view of the trailer arrangement of FIG. 3 of the instant invention.
Figure 7:
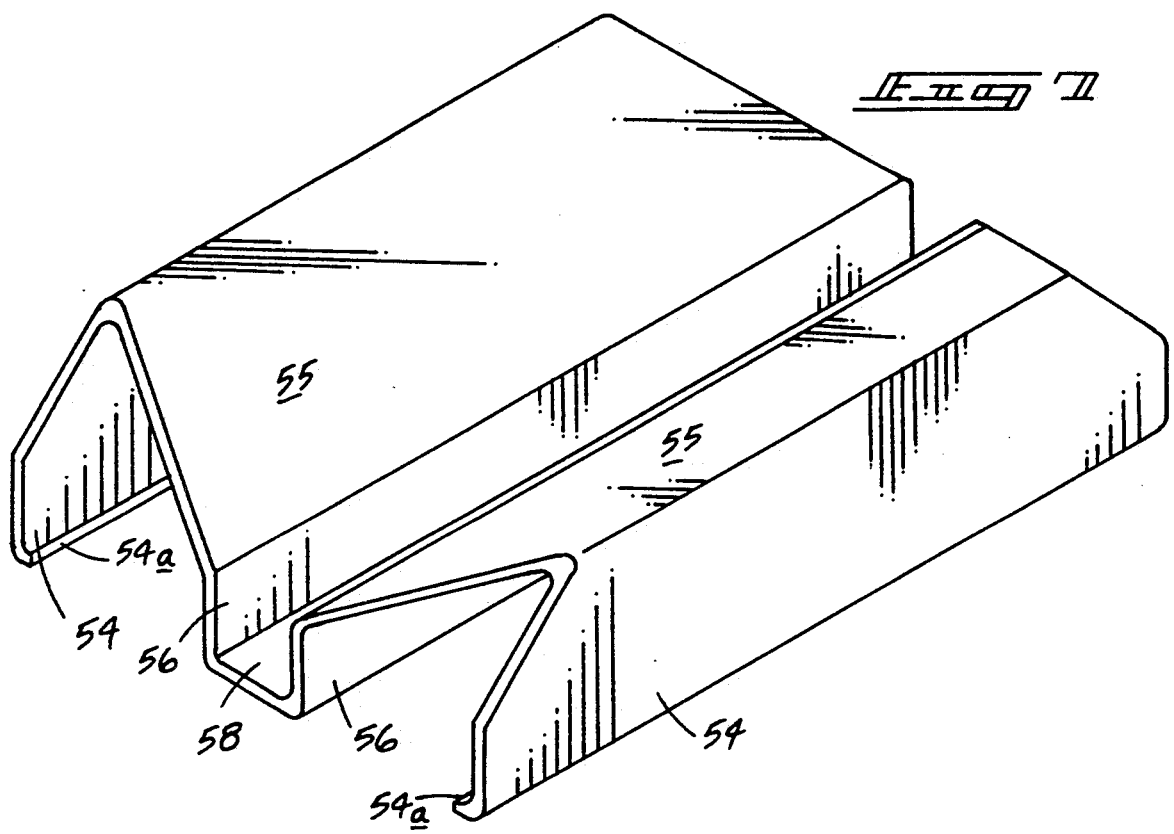
FIG. 7 is an isometric illustration of the support stand of the instant invention.
Figure 8:
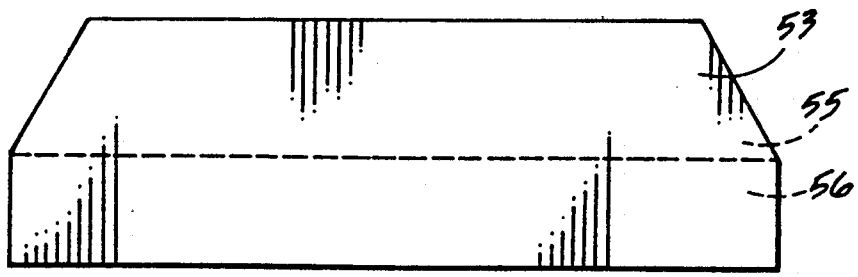
FIG. 8 is an orthographic side view taken in elevation of the support stand of the instant invention as illustrated in FIG. 7.

Reference to FIGS. 2 and 4 illustrates the trailer housing 46 formed with a lower surface 49, with the chamber 47 defined by interior walls 50, wherein an acute angle 52 is formed between the interior walls 50 and the lower surface 49 of the housing 46. Furthermore, the trailer housing 46 is provided with a fully reinforced strut construction formed integrally with the walls of the housing to permit the trailer to accommodate free-standing positioning, once removed from an associated bicycle arrangement, and further ensure geometrical integrity of the organization. The trailer housing 46 is also formed with a removable lid 53 permitting use of the lid as a table due to its planar top surface construction. The housing also accommodates compartmentalization therewithin to permit segregation of various components stored within the trailer during its use with the associated bicycle. Also it should be noted that the lower surfaces 49, due to their inclination at the aforenoted acute angle 52, provides adequate ground clearance during cornering procedures effected by the use of the bicycle and trailer combination. Reference to FIGS. 2, 7 and 8 illustrates the use of a trailer wheel support stand 53 selectively employed in combination with the trailer 46, wherein the support stand 53 includes spaced parallel exterior side walls 54 formed with interiorly directed flanges 54a at their lowermost ends with top walls 55 directed interiorly between the side walls 54 forwardly to vertical spaced, parallel side walls 56. An obtuse angle 57 is formed between the top walls 55 and the interior side walls 56, wherein the obtuse angle 57 is complementary to that of the acute angle 52, wherein the acute angle 52 and the obtuse angle 57 define 180 degrees, wherein the support stand 53 supports the trailer housing 46 with a floor plate 58 securing lowermost terminal ends of the spaced interior side walls 56 together, as illustrated in FIG. 2 for example, within a support channel 59 defined between the spaced interior side walls 56 and the floor plate 58. It is understood when not in use the support stand 53 may be transported interiorly of the trailer housing 46 for subsequent use to maintain the bicycle and trailer apparatus 10 in a vertically aligned orientation for temporary support.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle and trailer apparatus comprising, in combination, a bicycle including forward and rear wheels mounted within the bicycle including a vertical main support telescopingly receiving a bicycle seat support therewithin at an upper end of the main support, and a link member extending horizontally and overlying the rear wheel and a further link member extending from an axle of the rear wheel upwardly and spaced from a rear terminal end of the link member, and the rear terminal end of the link member and an upper terminal end of the further link member secured in a spaced relationship to a mounting yoke, and a trailer housing including a hitch pin means mounted within a hitch pin housing for vertical and horizontal rotation relative to the hitch pin housing, the hitch pin housing including a plurality of trailer links to secure the trailer housing to the hitch pin housing, the trailer housing including a tire member rotatably mounted therewithin, and the hitch pin selectively secured to the mounting yoke for limited vertical and horizontal rotation of the hitch pin relative to the mounting yoke, and wherein the mounting yoke comprises an "L" shaped member including a horizontal lower leg and a vertical upper leg extending orthogonally and integrally from the horizontal leg, wherein the horizontal leg includes a bifurcated upper end to pivotally receive a cup member therewithin, the bifurcated upper end includes a first leg spaced from and parallel to a second leg, wherein the second leg extends upwardly and beyond the first leg, and an "L" shaped cup member pivotally mounted between the first and second legs, the "L" shaped cup member including a first cup leg including a semicylindrical recess directed within a lower surface of the first cup leg, and a lock aperture directed through the second cup leg, the lock aperture aligned with a further lock aperture directed through an upper end of the second leg of the "L" shaped cup member is in a lowered position, and a lock pin selectively receivable through the lock aperture and the further lock aperture when the "L" shaped cup member is in the lowered second position, and a further cup shaped recess directed interiorly within an upper surface of the vertical leg of the "L" shaped yoke, the further semi-cylindrical recess aligned with the semi-cylindrical recess when the "L" shaped cup member is in the lowered second position, and the first and second semi-cylindrical recesses spaced a distance equal to a predetermined length defined by the hitch pin.

2. A bicycle and trailer apparatus as set forth in claim 1 wherein the hitch pin housing is defined by spaced parallel side walls, the side walls defined by aligned mirror imaged, truncated triangular segments secured together at their forwardmost ends to define an upper "V" shaped chamber and a lower "V" shaped chamber within the hitch plate housing, and the hitch pin rotatably mounted medially of the housing about a horizontal axis directed orthogonally through a hitch pin axis defined longitudinally of the hitch pin, and the hitch pin including an upper and lower spherical end directed exteriorly of the housing.

3. A bicycle and trailer apparatus as set forth in claim 2 wherein the trailer housing includes a central chamber aligned with and parallel to side walls of the trailer housing, and the trailer housing including lower surface walls integrally mounted at an acute angle to interior walls of the trailer housing, with the tire member rotatably mounted between the spaced interior side walls and extending below the lower surface walls a predetermined tire distance.

4. A bicycle and trailer apparatus as set forth in claim 3 further including a trailer wheel support stand, the trailer wheel support stand including spaced parallel exterior side walls formed with inwardly directed bottom flanges and top walls directed downwardly and interiorly between the side walls and integrally mounted to spaced interior parallel side walls, wherein the spaced interior side walls are spaced a distance substantially equal to a distance defined between the interior walls of the trailer housing, and the spaced interior side walls of the support stand include a floor plate aligned with the inwardly directed flanges of the exterior side walls to define a support channel between the spaced interior side walls and the floor plate to receive the tire member therewithin, wherein the spaced interior side walls are of a height substantially equal to the predetermined tire distance.

5. A bicycle and trailer apparatus as set forth in claim 4 wherein the top walls of the support stand and the spaced interior side walls of the support stand define an obtuse angle interiorly thereof, wherein the obtuse angle and the acute angle are complementary and define 180 degrees.

* * * * *